Sept. 25, 1934.   H. H. PEARL   1,974,831

UTENSIL COVER AND RELEASING MEANS THEREFOR

Filed July 27, 1932

INVENTOR-
Herman H. Pearl
BY
his ATTORNEY-

Patented Sept. 25, 1934

1,974,831

UNITED STATES PATENT OFFICE 1,974,831

UTENSIL COVER AND RELEASING MEANS THEREFOR

Herman H. Pearl, Lordville, N. Y.

Application July 27, 1932, Serial No. 624,932

5 Claims. (Cl. 220—47)

This invention relates to utensil covers and releasing means therefor, and has for its primary object and purpose to provide a cover for pots and other vessels or containers provided with means whereby said cover may be easily applied to securely close the open end of the vessel together with simple and easily operable means mounted on the handle of the vessel for effecting the release of the cover in order to permit of its easy removal.

It is a more particular object of the invention to provide a cover for vessels or containers having a peripheral flange of considerable depth provided on its edge with an inwardly turned bead of varying diameter circumferentially of said flange, whereby in the application of the cover, said bead, at diametrically opposite sides thereof, will cooperate with the bead on the upper edge of the vessel wall to distort said flange so that in the tendency of said flange to return to its normal position, the bead thereof will be urged inwardly and together with the flange will cooperate with the bead on said vessel to hold the cover in tight sealing contact with the upper surface of said bead.

It is another detail object of the invention to provide a simple and inexpensive handle construction for the vessel having outwardly struck lugs underlying the bead on the upper edge of the vessel wall and with which the bead on the cover is adapted to cooperate so as to position the latter bead for proper engagement by a pivoted lever mounted on the handle, whereby the cover flange at one side thereof may be sprung outwardly to facilitate the removal of said cover from the vessel.

With the above and other objects in view, the invention consists in the improved utensil cover and releasing means therefor, as will be hereinafter more fully described, illustrated in the accompanying drawing and subsequently incorporated in the subjoined claims.

In the drawing wherein I have disclosed one simple and practical embodiment of the invention, and in which similar reference characters designate corresponding parts throughout the several views,—

Figure 1:
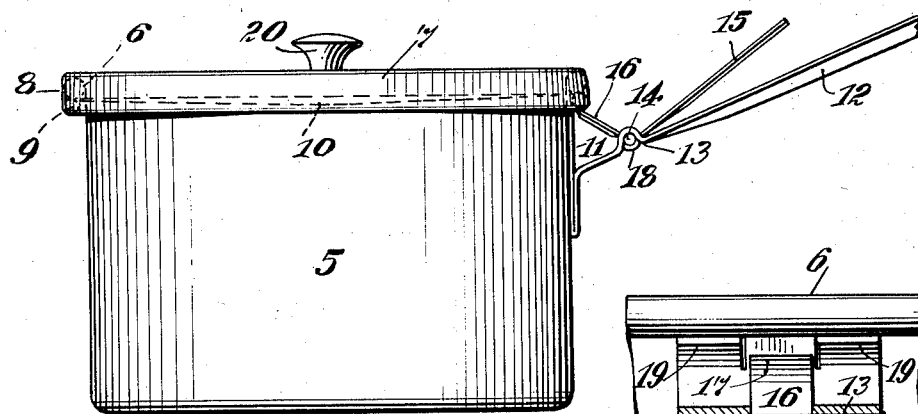
Figure 1 is a side elevation of a pot or similar utensil having one embodiment of my present invention applied thereto.
Figure 4:
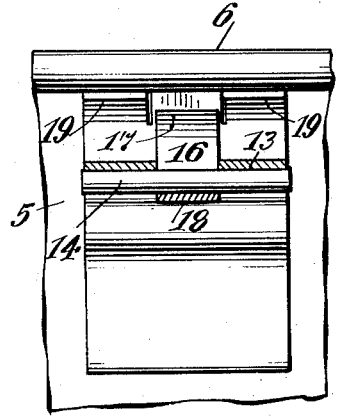
Fig. 4 is a transverse section taken on the line 4—4 of Fig. 3.
Figure 2:
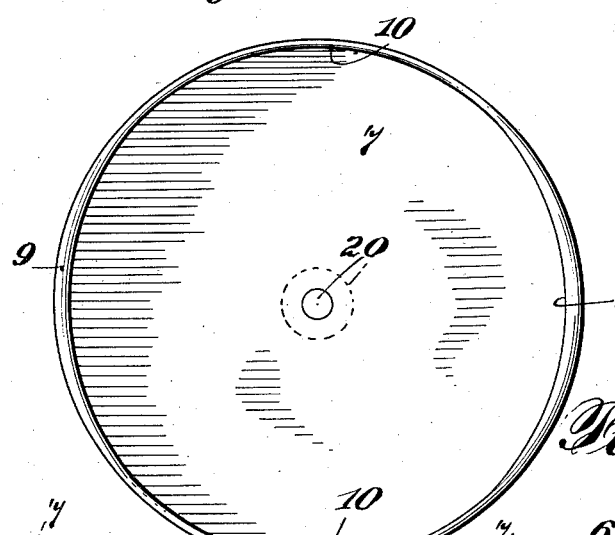
Fig. 2 is a bottom plan view of the cover.
Figure 3:
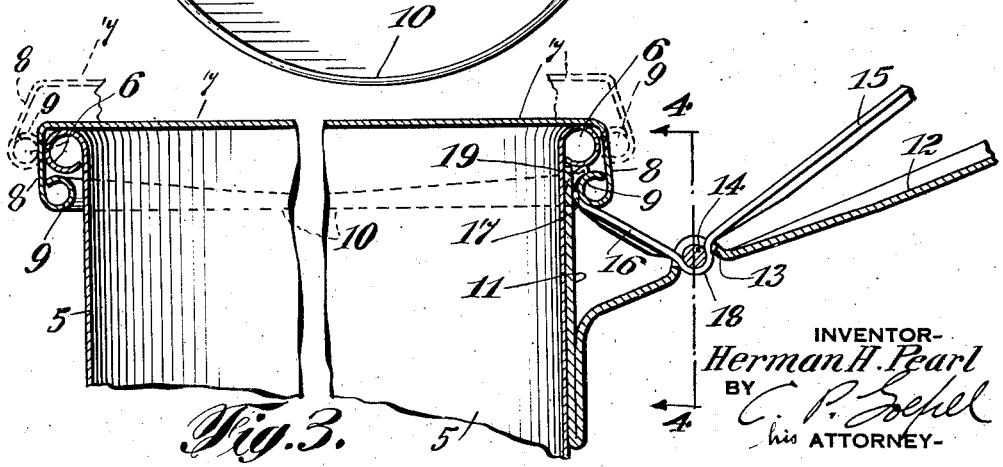
Fig. 3 is a vertical sectional view.

Referring in detail to the drawing, 5 designates the body of the pot or vessel, the wall of which is provided at its upper edge with the outwardly turned circumferential bead 6.

The cover 7 of the vessel consists of the stamping of sheet metal of suitable gauge and thickness having a continuous marginal flange 8 of appreciable depth which is resiliently yieldable relative to the body of the cover plate.

The cover flange 8 at its edge is also formed with an inwardly turned circumferentially continuous bead having parts 9 at opposite sides thereof of maximum diameter at their central portions and gradually tapering in opposite directions therefrom and merging into the bead sections 10 of relatively small diameter at the other diametrically opposite portions of the bead. The lower edge of this bead preferably lies in a single plane, the taper or inclination from the large diameter parts 9 to the small diameter parts 10 thereof being at the upper side of the bead.

The pot or vessel is provided with a handle of rigid bar metal, and as herein shown, one end of this metal handle bar is folded or bent upon itself to provide the part 11 extending vertically upon the outer side of the body wall of vessel 5 and welded or otherwise permanently fixed thereto. The body or shank of the handle as indicated at 12, projects at an upwardly oblique angle from the part 11, and is provided in spaced relation to said part with a central opening 13 therethrough, portions of the handle bar at each side of this opening being upwardly curved or bent into semi-cylindrical shape to receive the opposite ends of a pivot pin 14 which may be welded or otherwise rigidly fixed thereto.

A lever 15 has one end thereof angularly bent as at 16 and terminating in a curved finger 17. At the juncture of part 16 of the lever with the other end portion thereof, said lever is formed with the semi-circular bend 18 therein extending through the opening 13 and providing a concave bearing seat for the pin 14 upon which said lever is adapted to rock.

The upper end of the part 11 of the handle bar has opposite edge portions thereof bent laterally to form the curved lugs 19 which immediately underlie the bead 6 on the wall of the vessel 5.

When the cover member is applied to the upper open end of the vessel, the bead on the flange 8 thereof contacts with the convex outer surface of the bead 6 on the vessel wall so that said flange is laterally sprung outwardly or distorted from its normal position. As the inner sides of the parts 9 of the cover bead ride over the maximum diameter of the bead 6, said bead sections 9 and the corresponding parts of flange 8 are further sprung outwardly while the bead sections 10 and the other parts of the flange 8 are contracted or drawn inwardly. The easy and quick application of the cover is thus facilitated and when the cover bead is positioned below the bead 6, all parts of the flange 8 will then return to normal position so that the cover bead will closely underlie the bead on the wall of the vessel. At one side of the vessel, the inward movement of one of the bead sections 9 is limited by contact thereof with the curved fingers 19 of the handle bar which tends to laterally shift the cover and thereby closely bind the remaining parts of the cover flange 8 against the outer side of the bead 6, thereby retaining the top of the cover member in close sealing contact upon the upper surface of said bead.

The bead section 9 which is engaged with lugs 19 also bears upon the curved finger 17 on the end of the releasing lever 15. Therefore when it is desired to remove the cover, this can be easily done by pressing the outer end of lever 15 downwardly towards the handle bar 12. One side of the cover flange 8 is thus sprung outwardly and upwardly so that the bead section 9 thereon may easily ride over the bead 6 of the body wall of the vessel. The cover at the center thereof is, of course, provided with a suitable knob or handle indicated at 20 whereby, upon the actuation of the releasing lever 15, the said cover can be conveniently lifted and removed from the upper end of the vessel.

From the foregoing description considered in connection with the accompanying drawing, the construction, manner of use and several advantages of my present invention will be clearly and fully understood. It will be seen that I have devised an improved cover holding or retaining means for cooking utensils and other vessels which enables the cover to be easily and quickly applied without great manual effort and also easily removed, while at the same time an effective sealing or closure of the vessel is obtained. It will be understood that the particular form of the vessel or the relative diameters of the cooperating beads on the vessel body and its cover, are not essential and that my invention may be advantageously used in connection with receptacles or containers employed for a great variety of different purposes. Therefore it is to be understood, although I have herein shown and described one simple and practical embodiment of my present improvements, that the essential features thereof may also be incorporated in other various alternative mechanical structures, and I therefore reserve the privilege of resorting to all such legitimate changes therein as may be fairly embodied within the spirit and scope of the invention as claimed.

I claim:

1. In combination with a vessel having a continuous annular bead at its upper open end, a cover therefor provided with a continuous marginal flange having an inwardly turned continuous bead on the edge thereof of alternate circumferential sections of relatively large and small diameters and adapted to cooperate with the bead on the body wall of the vessel to retain the cover in its applied position, the beads being of non-uniform diameter in respect to each other when applied to each other, so that upon pressure being applied to the cover of the vessel the beads move in respect to each other whereby the opposing portions of the smallest diameter are moved away from each other and the opposing portions of the largest diameter are moved towards each other while the respective beads press together, and a clamping action of the respective beads to each other is obtained.

2. In combination with a vessel having a continuous bead of uniform diameter at the upper open end thereof, a cover for said vessel provided with a resiliently yieldable marginal flange having its edge inwardly turned and formed to provide a continuous bead thereon having alternate circumferential sections of relatively different diameter, the opposite bead sections of larger diameter cooperating with the bead on the body wall of the vessel to outwardly expand such parts of the flange, and the bead sections of smaller diameter permitting of the inward contraction of the other parts of said flange.

3. In combination with a vessel having a continuous bead of uniform diameter at the upper open end thereof, a cover for said vessel provided with a resiliently yieldable marginal flange having its edge inwardly turned and formed to provide a continuous bead thereon having alternate circumferential sections of relatively different diameter, the opposite bead sections of larger diameter cooperating with the bead on the body wall of the vessel to outwardly expand such parts of the flange, the bead sections of smaller diameter permitting of the inward contraction of the other parts of said flange, a handle bar fixed to the body wall of the vessel having a vertical end portion provided with outwardly curved lugs underlying the bead on said body wall and engaged by one of the larger bead sections on the cover flange, and a releasing lever pivotally mounted on the handle having a curved finger at one end for bearing engagement against the inner side of said cover bead section to effect the release of the cover.

4. A cover for culinary vessels having a continuous marginal flange resiliently yieldable from its juncture with the cover plate, said flange being provided on its free edge with inwardly turned structurally continuous bead sections, adjacent bead sections being of relatively different diameters and merging into each other to provide an inner perimeter of variable diametric dimension, opposite sections of said bead of the larger diameter cooperating with a cylindrical bead on the upper edge of a vessel wall as the cover is applied thereto to expand said beaded flange sections in the outward direction and simultaneously inwardly contract the intervening flange sections having the smaller bead diameter, whereby said bead sections of the cover flange are retained in interlocking engagement with the underside of the bead on the vessel wall when said flange sections resume a normal relation to the cover plate.

5. A cover for culinary vessels having a continuous marginal flange resiliently yieldable from its juncture with the cover plate, the opposed free edges of the diametrically opposite sections of the flange having a different diameter than the remaining portions of the cover, a vessel of substantially uniform diameter at its free upper edges, said cover upon application to the vessel being adapted to expand said flange sections outwardly and simultaneously inwardly contract the intervening sections of said flange, whereby said cover is retained in interlocking engagement with the underside of the bead on the vessel wall when the said flange sections resume a normal relation to the cover plate.

HERMAN H. PEARL.